No. 698,336. Patented Apr. 22, 1902.
W. STUBBLEBINE.
FURNACE.
(Application filed Aug. 22, 1901.)
(No Model.) 5 Sheets—Sheet 5.

Witnesses
Inventor:
William Stubblebine
By Edson Bro's
Attorneys

UNITED STATES PATENT OFFICE.

WILLIAM STUBBLEBINE, OF BETHLEHEM, PENNSYLVANIA.

FURNACE.

SPECIFICATION forming part of Letters Patent No. 698,336, dated April 22, 1902.

Application filed August 22, 1901. Serial No. 72,950. (No model.)

*To all whom it may concern:*

Be it known that I, WILLIAM STUBBLEBINE, a citizen of the United States, residing at Bethlehem, in the county of Northampton and State of Pennsylvania, have invented certain new and useful Improvements in Furnaces; and I do hereby declare the following to be a full, clear, and exact description of the invention, such as will enable others skilled in the art to which it appertains to make and use the same.

My invention relates to improvements in metallurgical furnaces, more particularly that class using gaseous fuel, and is especially applicable to puddling, crucible, and open-hearth furnaces, also for heating boilers.

It aims to effect more nearly the complete or perfect combustion of the fuel than has heretofore been possible. It seeks to set in motion or operation synchronously a hot-air blast or blasts and the gases arising from the fuel in combustion and after combining or commingling the same deliver said commingled air and gases adjacently to the grate-compartment into the working compartment. Thus is induced an increased current or draft upon the products of combustion, augmenting the action thereof in the working chamber or compartment.

It further provides for the automatic discharge or delivery of the ash or residue from the grate or grates, also to provide conditions conducive or favorable to longevity of the life of the grate-bars, and to otherwise promote utility and convenience.

It also provides for the advantageous application of the air-blast to the ash pit or chamber to more equally distribute said blast through the ashes and over or among the grate-bars, thus avoiding the clinkering of the grate and throwing dirt into the working chamber or compartment of the furnace or boiler, resulting in creating a very intense heat, unaccompanied with any dirt whatever, as is generally the case with grates as heretofore used.

It further provides for facilitating or expediting the removal of the ashes or residue from the ash pit or chamber without requiring the opening of doors, &c., and for effecting such removal from each side of said chamber.

The invention consists of a series of air-blast pipes suitably adapted to be connected to an air-blast supply and means for taking the gaseous combustion products from the grate or fire-chamber and delivering the commingled or combined gas and air at a common point or points adjacently to said grate or fire-chamber into the working compartment or chamber, all substantially as hereinafter more fully disclosed, and particularly pointed out by the claims.

Figure 1:
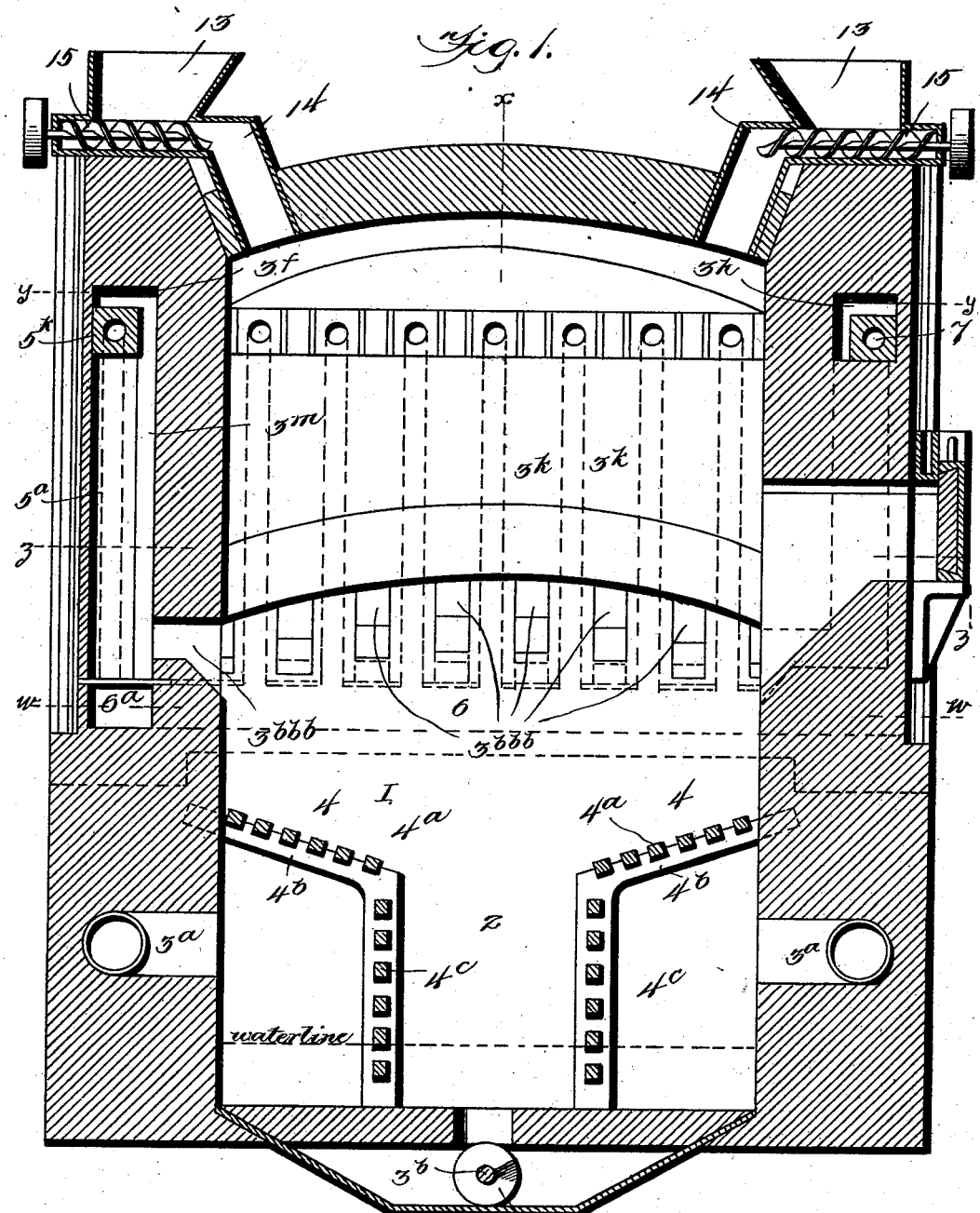
Figure 2:
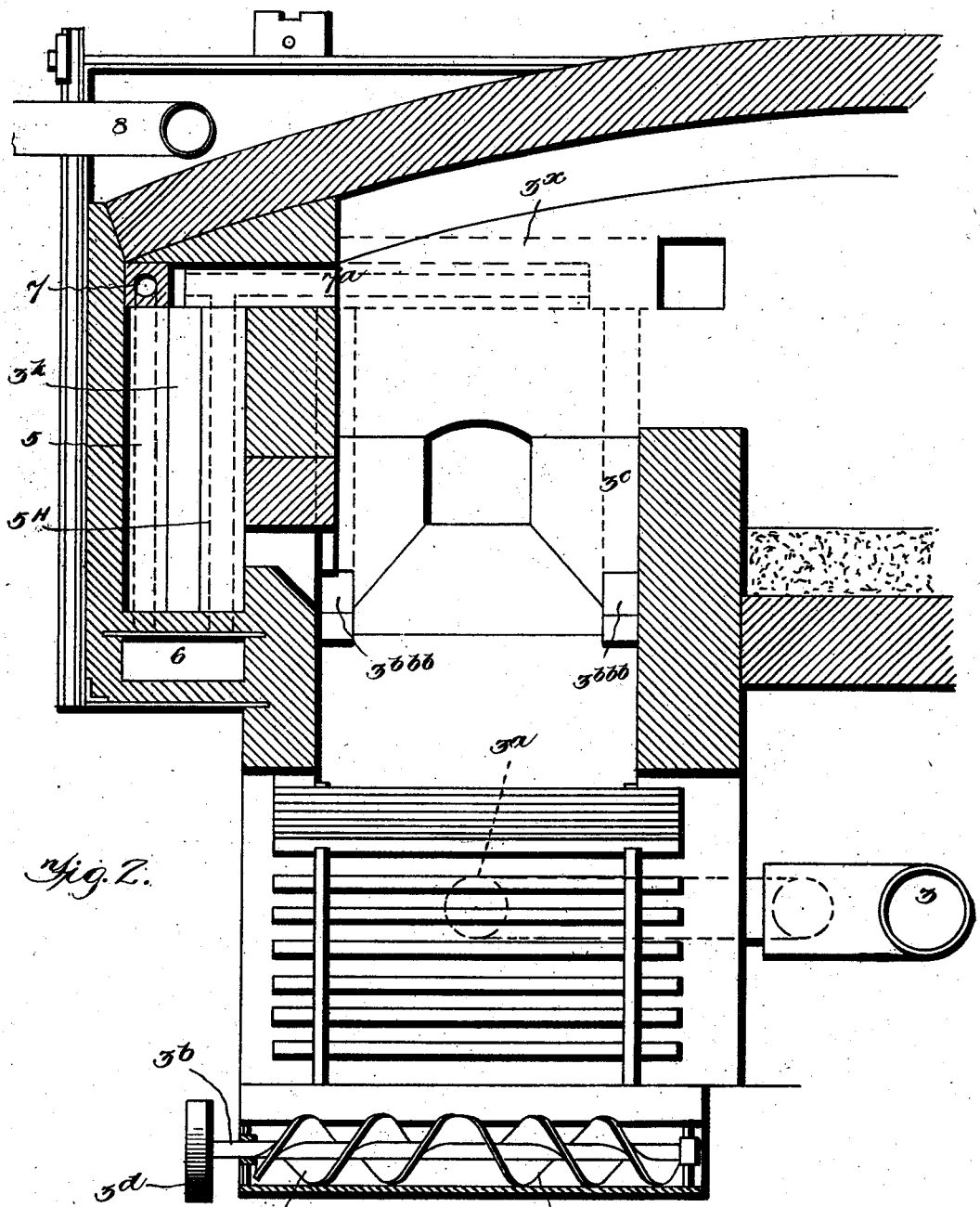
Figure 3:
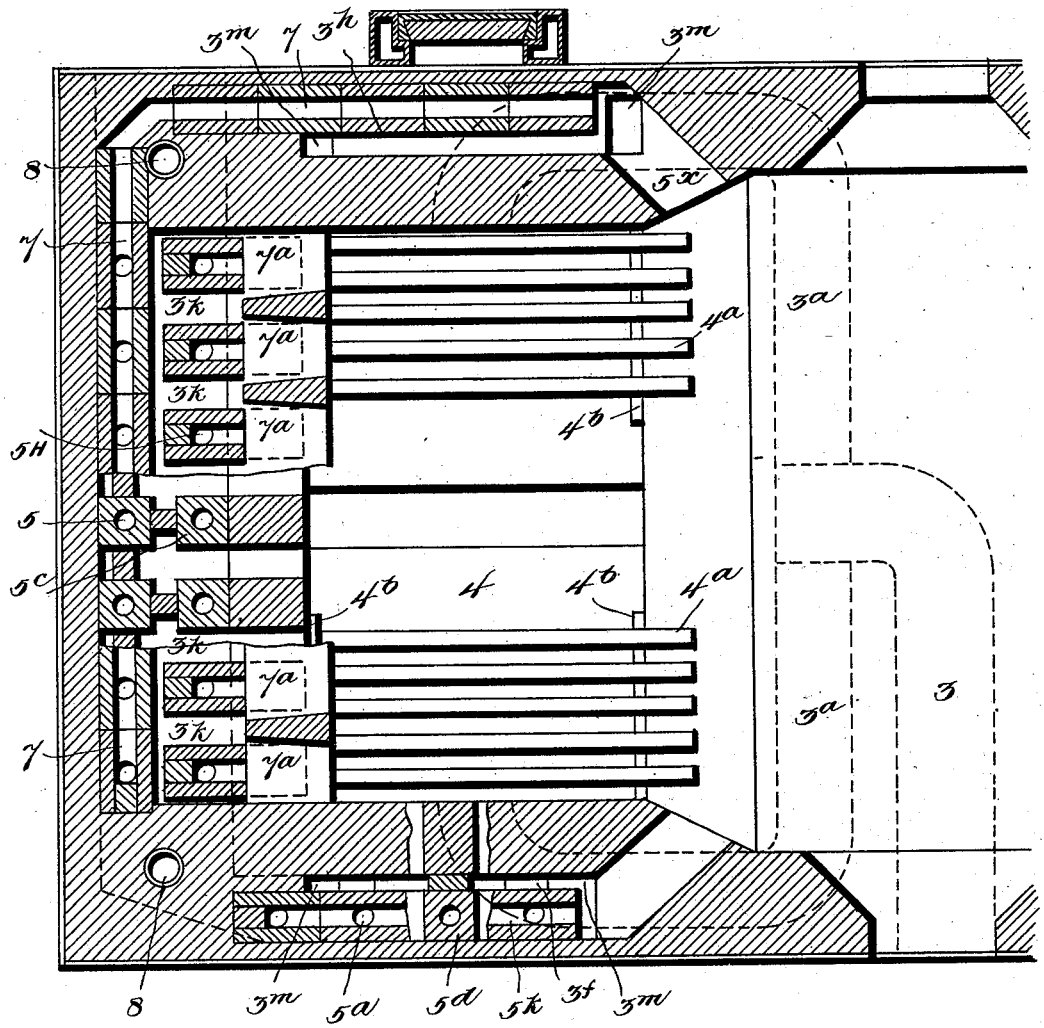
Figure 4:
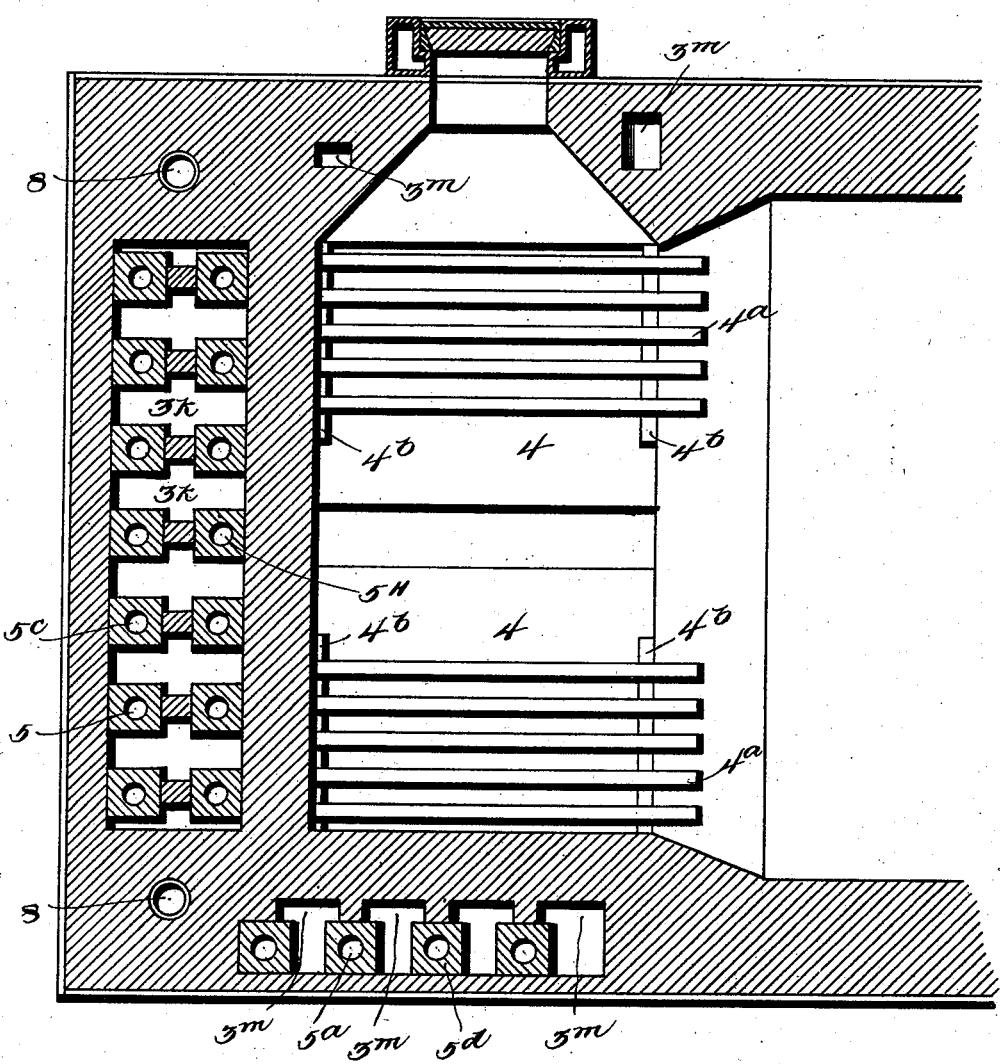
Figure 5:
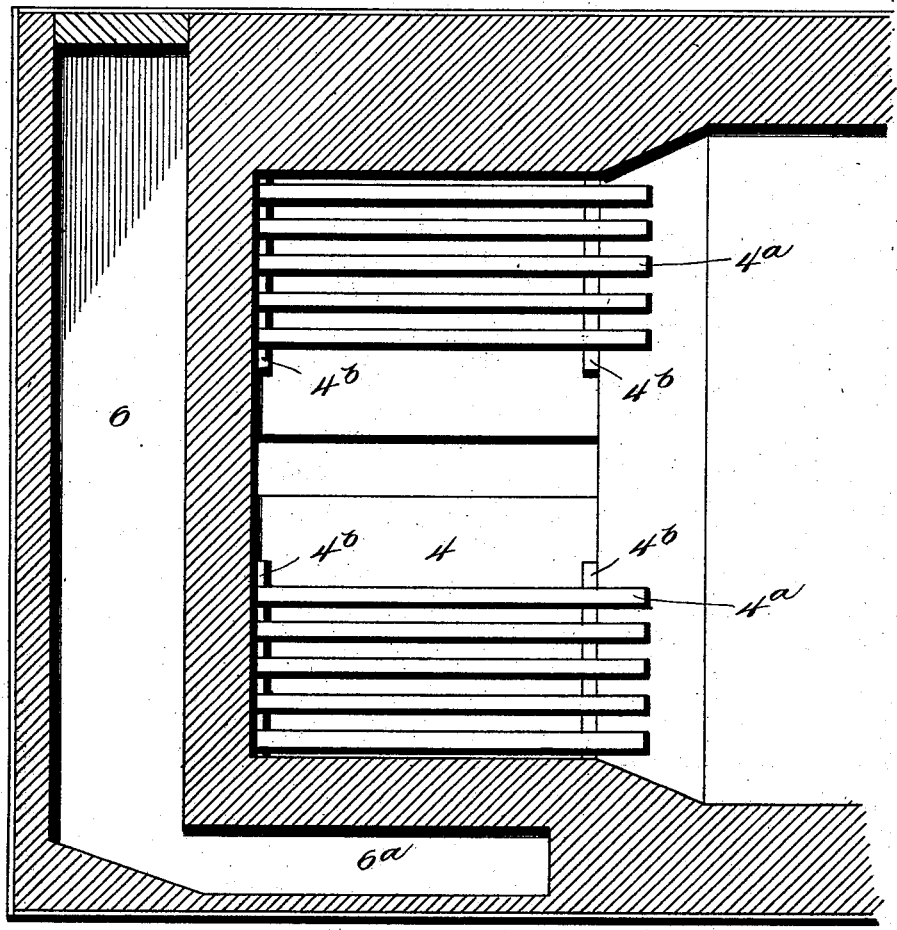
Figure 6:
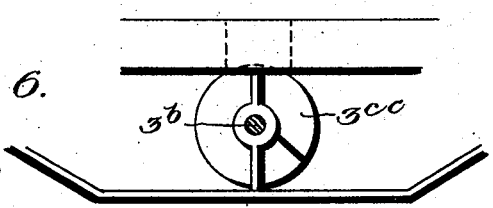

In the accompanying drawings, illustrating the preferred embodiment of my invention, Figure 1 is a vertical transverse section thereof. Fig. 2 is a vertical longitudinal section taken on the line $x\ x$ of Fig. 1. Fig. 3 is a horizontal section taken on the line $y\ y$ of Fig. 1. Fig. 4 is a section taken on the line $z\ z$ of Fig. 1. Fig. 5 is a section taken on the line $w\ w$ of Fig. 1. Fig. 6 is a detailed view more fully disclosing the means for removing the ashes.

Latitude is allowed herein as to details, as they may be changed or varied at will without departing from the spirit of my invention and the same yet remain intact and be protected.

In carrying out my invention I equip the combustion-chamber 1 of the furnace in the bottom portion with an ash-chamber 2 to receive the ashes or residue from the fuel, preferably water-sealed, or which may be used with or without a water seal, as desired. Directly above said chamber and forming the bottom of the fire or combustion chamber are arranged the grates or grate-sections 4 4, two in number, each comprising a series of suitably-spaced grate-bars $4^a$, supported upon inclined lateral bars $4^b$. Said bars are secured at their upper ends to and extend from the side walls of the combustion-chamber downward toward the center of said chamber, but standing away from each other. Said bars $4^b$ also have their lower ends extending straight down into and resting upon the bottom of the ash pit or chamber below the water seal. The supporting-bars $4^b$ are preferably connected by a series of cross pieces or bars $4^c$. Said grate-bars may be made from "square" or flat steel or iron bars. When made of flat bars, however, they are to be bent, as in giving the same characteristic structure of the grate edgewise. Also these grates may be produced in cast-iron sections. The ash-chamber 2 is always kept full of ashes, as the air entering said chamber and passing through the hot ashes has, together with the steam arising from the contact of water with the hot ashes, a salutary effect upon the grate-bars, keeping them in good condition at all times, yet being used continuously. A pipe 3, connecting with a suitable air-blast supply, (not shown,) has arms or branch pipes $3^a$ $3^a$, communicating at opposite points with the ash-chamber 2, one delivering the air-blast under each grate-section above the water seal and in a direction from the higher edge toward the lower edge of each grate-section. By this arrangement it will be observed that the air-blast is applied to more equally distribute the same through the individual grate-bars, thus avoiding the clinkering of the grate and throwing dirt into the working chamber of the furnace or boiler. The effect of this is to create a very intense heat, unattended with any dirt whatever, as is generally experienced in the use of this class of grates as heretofore constructed.

The combustion and ash-pit chambers are provided with the usual doors or openings through which access may be readily had thereto.

Arranged below the bottom of the ash chamber or pit, in alinement with an opening therein extending the length thereof, is a device or means for mechanically effecting the removal of the ashes or residue, comprising a shaft $3^b$, suitably journaled in position and equipped with a right-hand spiral or screw blade or conveyer $3^c$ and a left-hand spiral or screw blade or conveyer $3^{cc}$, arranged upon the opposite sides of about the transverse center of said shaft. Said shaft is also provided at one end with a pulley $3^d$, which may be belted to a suitable motor or machinery for actuating said shaft in operating the device. This device, it will be observed, provides for the removal of the ashes, &c., from the ash-chamber at opposite sides thereof and without the interposition of the hand to effect such removal.

Arranged in a lateral or side wall of the combustion-chamber and an end wall thereof are series of vertical pipes 5 $5^a$ $5^H$—say three inches in diameter—through which are passed air-blasts finally delivered or discharged adjacently to the fire or grate compartment into the working compartment of said chamber, as presently described. Said pipes are suitably incased within tubular bricks or casings $5^c$ $5^d$, respectively. The end wall series of said pipes 5 $5^H$ at their lower ends connect with a flue or pipe 6, extending in the plane both of the end wall and of one side wall of the grate or fire chamber or compartment, the lateral arm of said flue or pipe connecting with one of two lateral pipes $6^a$, arranged in the side or lateral walls of said chamber, connecting with valved vertical, &c., air-blast supply-pipes 8.

The upper ends of the pipes 5 connect with one arm of a horizontal pipe 7, also lying in the plane of one end wall and of one side wall and opening into the combustion-chamber at $5^x$. The upper ends of the pipes $5^H$ connect with short pipes 9, opening into the combustion-chamber, as at $7^a$.

The lateral wall-pipes $5^a$ connect at their lower ends with the other of the lateral pipes $6^a$ and connect at their upper ends laterally with a horizontal pipe $5^k$, opening into the opposite side of the combustion-chamber, as at $5^y$.

Passages or conduits $3^k$ in the end wall and passages $3^m$ in the lateral walls have communication with the combustion-chamber to receive the gases therefrom through the ports $3^{bb}$ $3^{bbb}$, produced in the walls of said chamber. The gases entering the conduits or passages $3^m$ via the ports $3^{bb}$ after passing therethrough enter and pass through the passages $3^f$ $3^h$, containing the pipes $5^k$ 7, and back into the combustion-chamber at $5^x$ $5^y$. The gases entering the conduits $3^k$ via the ports $3^{bbb}$ after passing therethrough pass back into the combustion-chamber at $7^a$, thus providing for the heating of the air-blasts and their commingling with the gases at the points of delivery thereof into the combustion-chamber. This, as will be seen, has the effect to induce increased or augmented draft or suction-currents in the combustion-chamber to provide for effecting more nearly complete or perfect combustion than heretofore possible, which of course will increase the efficiency and producing capacity of the furnace or boiler.

Suitable means are provided for feeding or supplying, preferably by power, the fuel or coal to the furnace, which may comprise a hopper 13, delivering into a trough or chute 14, with its discharging downward inclined end portion passing through the top of the furnace about in alinement with a grate 4. Within said trough or chute is arranged a spiral or helical conveyer 15, suitably journaled in place and having a pulley fixed to its outer end adapted to be belted to a suitable motor or driver, and thus actuated to feed or convey the fuel through said chute or trough, which is finally delivered into the furnace as required.

Having thus fully described my invention, what I claim as new, and desire to protect by Letters Patent, is—

1. In a furnace of the character described, air-blast-conducting passages or pipes, and pipes taking gases from the combustion-chamber and adapted to heat the air-blasts passing through the first-named passages or pipes, said air-blast, and gas, pipes or passages being arranged in the furnace-walls and delivering into the combustion-chamber, in a plane passing through said chamber, substantially as set forth.

2. In a furnace of the character described, air-pipes comprising upper and lower pipes connecting with an air-supply and connected together by additional pipes, and gas conduits or passages having ports or openings communicating with the combustion-chamber, and surrounding said air-pipes, and said air-pipes and gas-passages delivering at a common point or points, and into said combustion-chamber, all said pipes and passages being arranged in the furnace-walls, substantially as set forth.

3. In a furnace of the character described, air-pipes connecting with an air-supply, comprising upper and lower pipes with intermediate connecting-pipes tubular bricks or sleeves incasing said pipes, and gas passages or conduits surrounding said air-passages and having ports or openings communicating with the combustion-chamber, both said air and gas passages delivering their contents at a common point into said combustion-chamber, all said pipes and passages being arranged in the furnace-walls, substantially as set forth.

4. In a furnace of the character described, a series of air passages or pipes, connecting with an air-supply, two series thereof comprising upper and lower pipes with interconnecting pipes tubular bricks or sleeves incasing said pipes, a third series of such pipes connecting with the aforesaid two series and having delivering-outlets, and gas conduits or chambers containing said series of air-pipes, and having ports or openings communicating with the combustion-chambers, said air-pipes and said gas conduits or spaces delivering their contents at a common point or points, into the combustion-chamber, substantially as set forth.

In testimony whereof I affix my signature in presence of two witnesses.

WILLIAM STUBBLEBINE.

Witnesses:
 GEO. L. BAUM,
 SEWARD L. FRITCHMAN.